US012749019B2

(12) United States Patent
Narayanam et al.

(10) Patent No.: US 12,749,019 B2
(45) Date of Patent: Sep. 29, 2026

(54) ACCELERATED LEARNING FROM SPATIO-TEMPORAL DATA

(71) Applicant: International Business Machines Corporation, Armonk, NY (US)

(72) Inventors: Krishnasuri Narayanam, Bangalore (IN); Kamanchi Chandramouli, Guntur District (IN); Pankaj Satyanarayan Dayama, Bangalore (IN); Mudhakar Srivatsa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 18/358,113

(22) Filed: Jul. 25, 2023

(65) Prior Publication Data

US 2025/0037013 A1 Jan. 30, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2018/0018584 A1 1/2018 Nock
2020/0027016 A1 1/2020 Rouhani
2020/0226491 A1 7/2020 Ben-Itzhak

FOREIGN PATENT DOCUMENTS

CN 112396231 A 2/2021

OTHER PUBLICATIONS

Chan, Philip K., and Salvatore J. Stolfo. "Learning Arbiter and Combiner Trees from Partitioned Data for Scaling Machine Learning." KDD. vol. 95. 1995. (Year: 1995).*

Li, Ruiyuan, et al. "Distributed spatio-temporal k nearest neighbors join." Proceedings of the 29th international conference on advances in geographic information systems. 2021. (Year: 2021).*

"How Does Speech to Text Software Work | Amberscript", Amberscript, May 8, 2023, © 2023 Amberscript Global B.V., 15 pages, <https://www.amberscript.com/en/blog/how-speech-to-text-software-works/>.

(Continued)

*Primary Examiner* — Eric Nilsson

(57) ABSTRACT

A computer-implemented method, a computer program product, and a computer system for accelerated learning. A computer partitions an independent variable of input data into partitions. A computer creates data samples in each of the partitions, where each of the data samples has less granularity. For each of the partitions, a computer trains a machine learning model independently on each of the data samples and compares results of training on the data samples. For each of one or more partitions in which results of training on a predetermined number of the data samples are statistically identical at a predetermined confidence level, a computer outputs a result of training on one of the data samples. For each of one or more rest partitions in which no result of training has been outputted, a computer merges each pair of the data samples and uses merged data samples to train the machine learning model.

18 Claims, 6 Drawing Sheets

Partition with Overlaps

(56) References Cited

OTHER PUBLICATIONS

Kim et al., "Sampling techniques for big data analysis in finite population inference", arXiv:1801.09728v1 [stat.ME] Jan. 29, 2018, 24 pages.

Seiffert et al., "Improving Software-Quality Predictions With Data Sampling and Boosting", IEEE Transactions on Systems, Man, and Cybernetics—Part A: Systems and Humans, vol. 39, No. 6, Nov. 2009, 12 pages.

* cited by examiner

Partition without Overlaps

Partition with Overlaps

ACCELERATED LEARNING FROM SPATIO-TEMPORAL DATA

BACKGROUND

The present invention relates generally to machine learning, and more particularly to accelerated learning from spatio-temporal data.

In general, more granular data is good for the task of training a machine learning model. More granular data helps obtain better accuracy of a trained machine learning model. However, as data size grows, more time and more computing resources are needed in a task of training a machine learning model. When highly granular data is supplied, scaling becomes a challenging problem. Localization of noisy portions in highly granular data is also a challenging problem. Not all data may be needed when the data is highly granular; therefore, a problem about how to filter the highly granular data for training or testing a machine learning model needs to be solved.

SUMMARY

In one aspect, a computer-implemented method for accelerated learning is provided. The computer-implemented method includes partitioning an independent variable of input data into partitions with respect to a space/time measurement. The computer-implemented method further includes creating data samples in each of the partitions, where each of the data samples represents the input data and has less granularity. The computer-implemented method further includes, for each of the partitions, training a machine learning model independently on each of the data samples. The computer-implemented method further includes, for each of the partitions, comparing results of training on the data samples. The computer-implemented method further includes, for each of one or more partitions in which results of training on a predetermined number of the data samples are statistically identical at a predetermined confidence level, outputting a result of training on one of the data samples. The computer-implemented method further includes, for each of one or more rest partitions in which no result of training on the data samples has been outputted, merging each pair of the data samples. The computer-implemented method further includes, for each of the one or more rest partitions, using merged data samples to train the machine learning model.

In another aspect, a computer program product for accelerated learning is provided. The computer program product comprises a computer readable storage medium having program instructions embodied therewith, and the program instructions are executable by one or more processors. The program instructions are executable to: partition an independent variable of input data into partitions with respect to a space/time measurement; create data samples in each of the partitions, where each of the data samples represents the input data and has less granularity; for each of the partitions, train a machine learning model independently on each of the data samples; for each of the partitions, compare results of training on the data samples; for each of one or more partitions in which results of training on a predetermined number of the data samples are statistically identical at a predetermined confidence level, output a result of training on one of the data samples; for each of one or more rest partitions in which no result of training on the data samples has been outputted, merge each pair of the data samples; and for each of the one or more rest partitions, use merged data samples to train the machine learning model.

In yet another aspect, a computer system for accelerated learning is provided. The computer system comprises one or more processors, one or more computer readable tangible storage devices, and program instructions stored on at least one of the one or more computer readable tangible storage devices for execution by at least one of the one or more processors. The program instructions are executable to partition an independent variable of input data into partitions with respect to a space/time measurement. The program instructions are further executable to create data samples in each of the partitions, where each of the data samples represents the input data and has less granularity. The program instructions are further executable to, for each of the partitions, train a machine learning model independently on each of the data samples. The program instructions are further executable to, for each of the partitions, compare results of training on the data samples. The program instructions are further executable to, for each of one or more partitions in which results of training on a predetermined number of the data samples are statistically identical at a predetermined confidence level, output a result of training on one of the data samples. The program instructions are further executable to, for each of one or more rest partitions in which no result of training on the data samples has been outputted, merge each pair of the data samples. The program instructions are further executable to, for each of the one or more rest partitions, use merged data samples to train the machine learning model.

DETAILED DESCRIPTION

In embodiments of the present invention, input data is used for training a machine learning model. In embodiments of the present invention, the input data is partitioned into partitions and in each partition multiple data samples are created. The data samples in each partition are independently used to train the machine learning model. Embodiments of the present invention result in saving in time, since a learning task is performed on sparse data samples.

Figure 1:
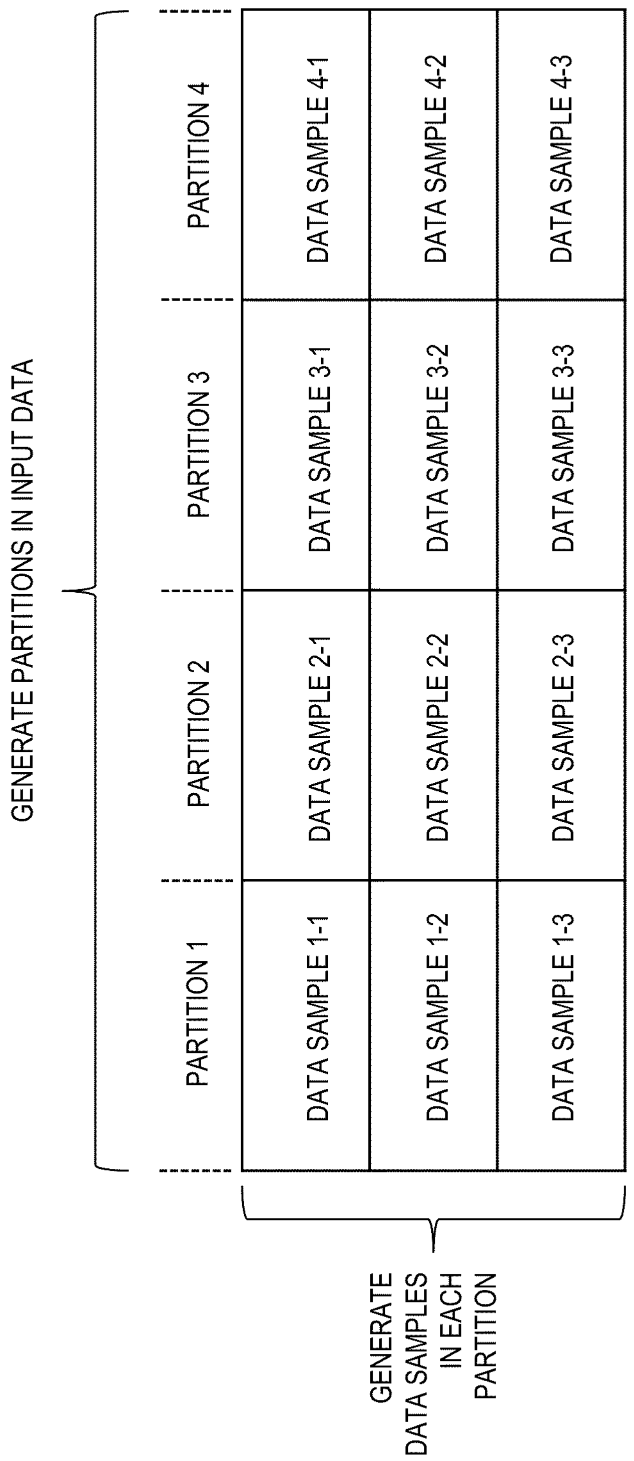
FIG. 1 illustrates partitioning input data into partitions and creating data samples in each partition, in accordance with one embodiment of the present invention.

FIG. 1 illustrates partitioning the input data into partitions and creating data samples in each partition, in accordance with one embodiment of the present invention. In an example shown in FIG. 1, horizontal partitions of the input data are generated. In horizontal partitioning, an independent variable of the input data is partitioned into partitions. The input data is partitioned into different horizontal partitions pertaining to geo/time slices. Data in each horizontal partition is processed (training and/or testing the machine learning model) independently to each other. In the example shown in FIG. 1, the input data is partitioned into partition 1, partition 2, partition 3, and partition 4. The number of partitions shown in FIG. 1 is for a purpose of illustration. It should be appreciated that the number of partitions can be any number depending on the requirement of the granularity of the data. In an example where data of a trajectory of a trip is the input data (which will be discussed in detail in later paragraphs as use case 1), the input data is partitioned with respect to the time. In an example where driving behavior data of a driver along a road (which will be discussed in detail in later paragraphs as use case 2), the input data is partitioned with respect to segments of the road.

The example shown in FIG. 1 illustrates created multiple data samples in each of the horizontal partitions. In the example shown in FIG. 1, in partition 1, data sample 1-1, data sample 1-2, and data sample 1-3 are created; in partition 2, data sample 2-1, data sample 2-2, and data sample 2-3 are created; in partition 3, data sample 3-1, data sample 3-2, and data sample 3-3 are created. The number of data samples in each partition shown in FIG. 1 is for a purpose of illustration. It should be appreciated that the number of data samples in each partition can be any number depending on the requirement of the granularity of the data. The number of the data samples is decided based on the granularity of the input data. If the granularity of the input data is higher, the greater number of the data samples are created. In identifying the granularity, the time intervals or spatial distances between data points of the input data are used. Each of the data samples represents the original input data and has less granularity. It may not be necessary to consider all data samples in training and/or testing the machine learning model when the number of samples is high. In an embodiment, some of these data samples are used for training a machine learning model and some other data samples are used for testing the learned models, while few other data samples may be discarded.

There are many ways of creating the data samples in each of the partitions. As one example, all odd data points may form a data sample, all even data points may form a data sample, or entire horizontal-partition may form a data sample. As another example, if three data samples are required, data points of a horizontal partition may be placed into 3 buckets in a round-robin fashion. As yet another example, for time series data, the input data in each horizontal partition may be divided into multiple data samples pertaining to stationary time intervals.

Prior to creating the partitions and creating data samples in each of the partitions, the input data may be preprocessed. Techniques such as data imputation will be used to fill missing data. If supplied input data is highly granular, certain data points may be dropped.

Figure 2A:
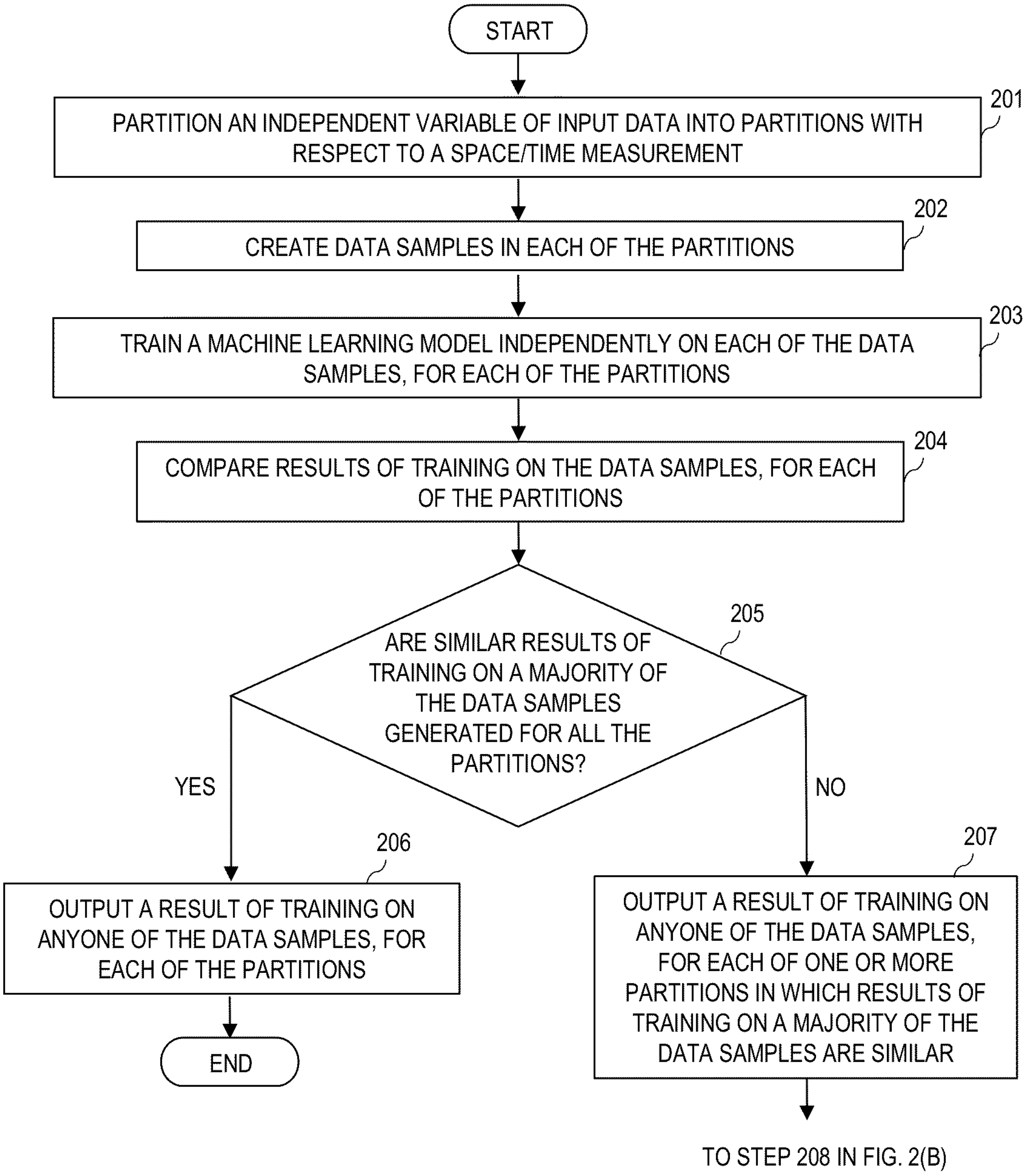
FIG. 2(A) and FIG. 2(B) present a flowchart showing operational steps of accelerated learning from spatio-temporal data, in accordance with one embodiment of the present invention.
Figure 2B:
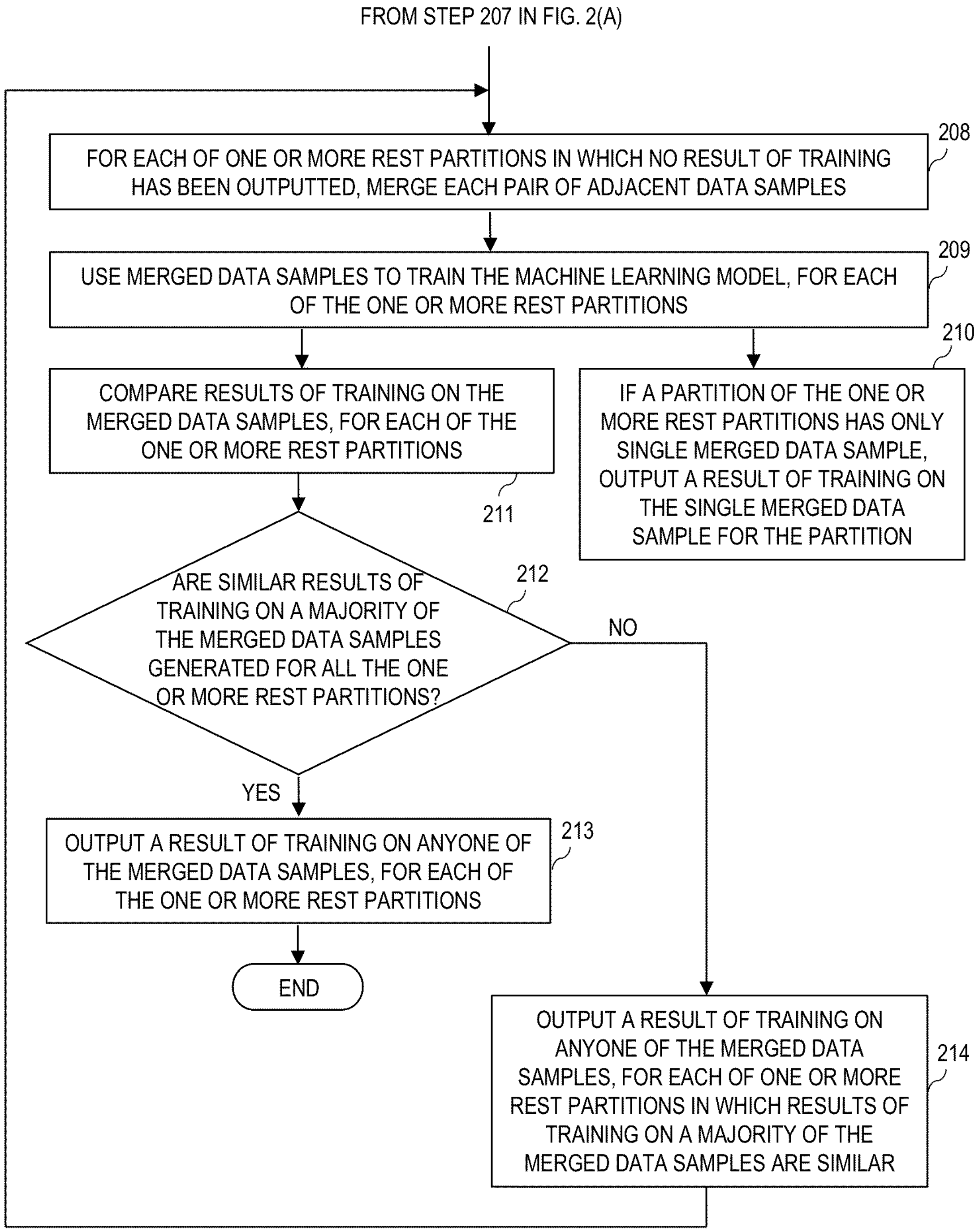
Figure 5:
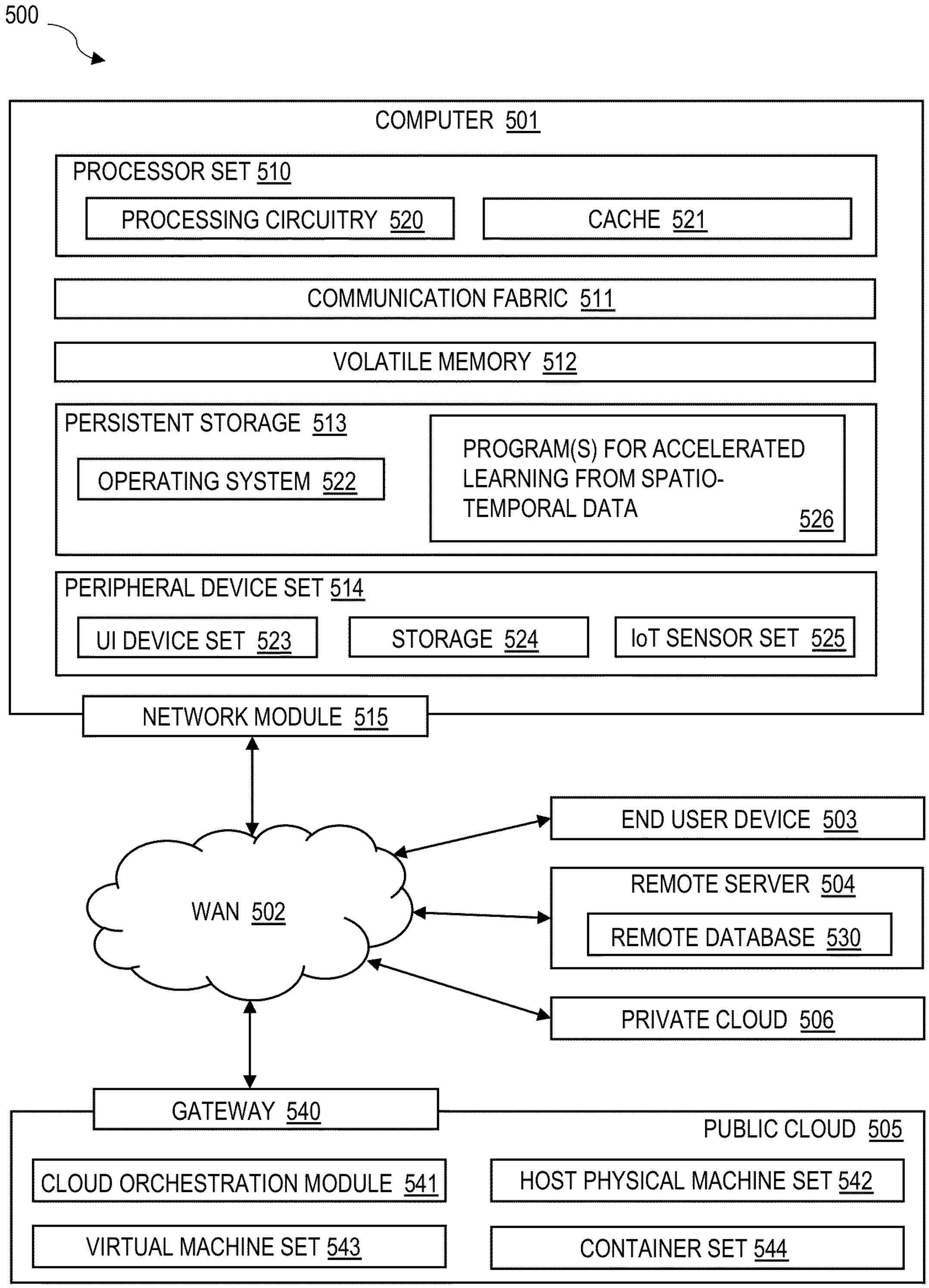
FIG. 5 is a systematic diagram illustrating an example of an environment for the execution of at least some of the computer code involved in performing accelerated learning from spatio-temporal data, in accordance with one embodiment of the present invention.

FIG. 2(A) and FIG. 2(B) present a flowchart showing operational steps of accelerated learning from spatio-temporal data, in accordance with one embodiment of the present invention. The operational steps shown in 2(A) and FIG. 2(B) are implemented by a computer system or server. Computer 501 shown in FIG. 5 is a typical computer system or server.

Referring to FIG. 2(A), in step 201, the computer system or server partitions an independent variable of input data into partitions with respect to a space/time measurement. The input data is used for training or testing a machine learning model. In this step, the input data is partitioned into different horizontal partitions pertaining to geo/time slices. Data in each horizontal partition is processed (testing and/or training the machine learning model) independently to each other. A learning task may be exercised on one partition considering only less data points, while at the same time the same learning task may be exercised on another partition considering more data points. In some scenarios, partitioning the input data into partitions may not possible; therefore, the entire input data may be considered as one partition. In other embodiments, a user partitions the input data into partitions.

In step 202, the computer system or server creates data samples in each of the partitions. Each of the data samples represents the original input data and is with less granularity. The number of the data samples is decided based on the granularity of the input data. In other embodiments, a user creates the data samples in each of the partitions. The created data samples in each of the partitions are used for accelerated learning from spatio-temporal data. Accelerated learning from spatio-temporal data is implemented in steps 203-213 which are described in the following paragraphs.

In step 203, the computer system or server trains a machine learning model independently on each of the data samples, for each of the partitions. A machine learning task is carried out independently on each data sample created. Complexity of running the machine learning task on a data sample depends on the size of the data sample, and the complexity can be brought down to lower orders like $O(\log(n))$ or $O(n^{1/2})$ where n is the number of records in the data sample.

In step 204, the computer system or server compares results of training on the data samples, for each of the partitions. In each partition, the output of training the machine leaning model on one data sample is compared with the output of training the machine leaning model on other data samples.

In step 205, the computer system or server determines whether similar results of training on a majority of the data samples are generated for all the partitions. In other words, the computer system or server determines whether results of training on a predetermined number of the data samples for all the partitions are statistically identical at a predetermined confidence level.

In response to determining that, for all the partitions, the similar results of training on a majority of the data samples are generated or the results of training on a predetermined number of the data samples are statistically identical at the predetermined confidence level (YES branch of decision block 205), in step 206, the computer system or server outputs a result of training on anyone of the data samples, for each of the partitions. In this scenario, the machine learning task is completed; the computer system or server ends the operational steps of accelerated learning from spatio-temporal data.

In response to determining that, for not all the partitions, the similar results of training on a majority of the data samples are generated or the results of training on a predetermined number of the data samples are statistically identical at the predetermined confidence level (NO branch of decision block 205), in step 207, the computer system or server outputs a result of training on anyone of the data samples, for each of one or more partitions in which results of training on a majority of the data samples are similar or results of training on the predetermined number of the data samples are statistically identical at the predetermined confidence level. In this scenario, in some partitions, similar results of training on a majority of the data samples are generated or a predetermined number of the data samples are statistically identical at the predetermined confidence level; therefore, for each of these partitions, the machine learning task is completed. However, in rest partitions (in which the results of training on the predetermined number of the data samples are not statistically identical at the predetermined confidence level or no result of training has been outputted), the machine learning task is not completed; the rest operational steps shown in FIG. 2(B) are needed for completing the machine learning task.

Referring to FIG. 2(B), in step 208, the computer system or server merges each pair of adjacent data samples, for each of one or more rest partitions in which no result of training has been outputted. In this step, in each of the one or more rest partitions, the computer system or server generates merged data samples. In some embodiments, the computer system or server may merge data samples which are not adjacent.

In step 209, the computer system or server uses the merged data samples to train the machine learning model, for each of the one or more rest partitions. The machine learning task is carried out independently on each of the merged data samples.

If a partition of the one or more rest partitions has only single merged data sample, in step 210, the computer system or server outputs a result of training on the single merged data sample for the partition. In other words, if only one merged sample data is left in one of the one or more rest partitions, the machine learning task is completed for this partition.

After training the machine learning model on the merged data samples in step 209, in step 211, the computer system or server compares results of training on the merged data samples, for each of the one or more rest partitions. In each of the one or more rest partitions, an output of training the machine leaning model on one merged data sample is compared with outputs of training the machine leaning model on other merged data samples.

In step 212, the computer system or server determines whether similar results of training on a majority of the merged data samples are generated for all the one or more rest partitions. In other words, the computer system or server determines whether a predetermined number of the merged data samples for all the one or more rest partitions are statistically identical at the predetermined confidence level.

In response to determining that, for all the one or more rest partitions, the similar results of training on a majority of the merged data samples are generated or a predetermined number of the merged data samples are statistically identical at the predetermined confidence level (YES branch of decision block 212), in step 213, the computer system or server outputs a result of training on anyone of the merged data samples, for each of the one or more rest partitions. In this scenario, the machine learning task is completed; the computer system or server ends the operational steps of accelerated learning from spatio-temporal data.

In response to determining that, for not all the one or more rest partitions, the similar results of training on a majority of the merged data samples are generated or a predetermined number of the merged data samples are statistically identical at the predetermined confidence level (NO branch of decision block 212), in step 214, the computer system or server outputs a result of training on anyone of the merged data samples, for each of one or more rest partitions in which results of training on a majority of the merged data samples are similar or results of training on predetermined number of the merged data samples are statistically identical at the predetermined confidence level. In this scenario, for each of the one or more rest partitions in which the results of training on a majority of the merged data samples are similar or results of training on predetermined number of the merged data samples are statistically identical at the predetermined confidence level, the machine learning task is completed.

However, for each of one or more rest partitions in which the results of training on the predetermined number of the merged data samples are not statistically identical at the predetermined confidence level, the computer system or server merges each pair of the merged data samples. The computer system or server reiterates steps 208-212, until the machine learning task is completed for all the partitions. If a partition has k data samples, the computer system or server may need log(k) iterations.

If the merged data samples in a partition need multiple iterations, the computer system or server flags data in this partition as noisy data. If the data in the partition is not noisy, the computer system or server uses only a subset of the data samples for training the machine learning model. If the computer system or server uses only subset of the data samples, the computer system or server uses discarded data sample during training to validate the machine learning model. The computer system or server leaves only few data samples in each of the partitions for validation of the machine learning model. Thus, the computer system or server can identify data samples for training, testing, and to-be-left-out.

This document discloses merging the data samples. However, it should be appreciated that, like merging the data samples within a partition, the computer system or server may merge adjacent partitions and create data samples on merged partitions.

Now, a first use case of the present invention is discussed. The first use case is about finding a trajectory of a trip. A user can annotate which parts of the trajectory need more data samples and which parts need less data samples; therefore, it helps accelerate the learning by only considering sparse data. A typical application scenario is the last mile delivery scenario, an actual trajectory of a trip taken by a delivery executive is one of the factors that determine how much delivery executive should be paid for a given delivery.

Figure 3A:
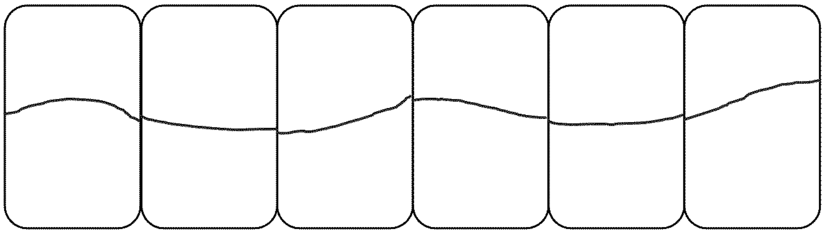
FIG. 3(A) and FIG. 3(B) illustrate how to partition input data into partitions in a use case, in accordance with one embodiment of the present invention.
Figure 3B:
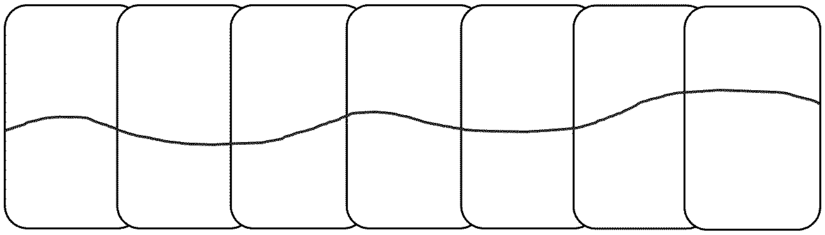

As shown in FIG. 3(A), in partitioning the trajectory data, the partitions with no overlap lead to a rough trajectory between partition boundaries. However, as shown in FIG. 3(B), partitions with overlaps lead to a smooth trajectory between partition boundaries. Partitioning the trajectory data with the overlaps causes a slight increase in the number of partitions. The amount of the overlaps between partitions can be configurable.

Figure 4A:
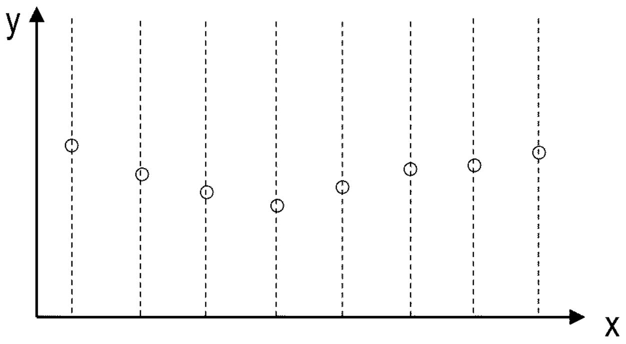
FIG. 4(A), FIG. 4(B), and FIG. 4(C) illustrate how to create data samples in each partition in a use case, in accordance with one embodiment of the present invention.
Figure 4B:
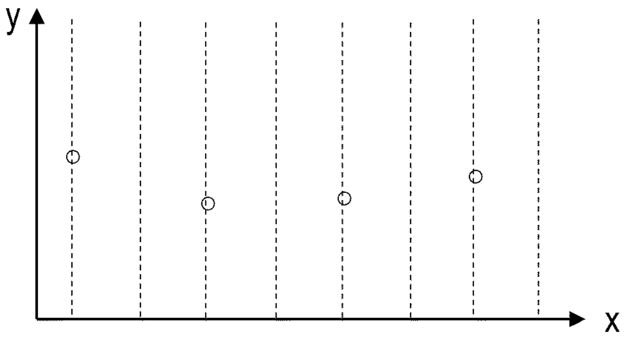
Figure 4C:
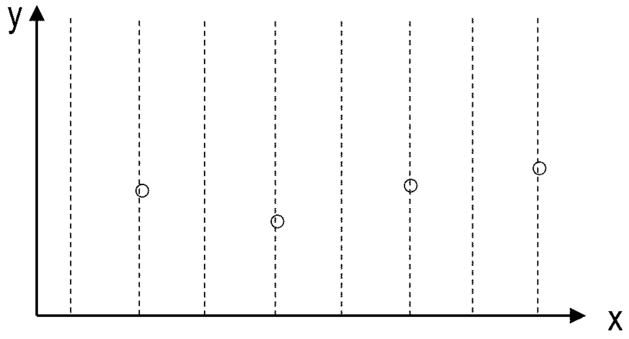

FIG. 4(A), FIG. 4(B), and FIG. 4(C) illustrate how to create data samples in a partition of the trajectory data. FIG. 4(A) illustrates that all data points are used for creating data samples. FIG. 4(B) illustrates that odd data points are used for creating data samples. FIG. 4(C) illustrates that even data points are used for creating data samples. More is the granularity of data, more will be the number of data samples. It is not necessary to consider all data samples for training a machine learning model with high granular data.

In some embodiments of the first use case, a machine learning model may be trained using different techniques like linear interpolation or map matching for different data samples.

A second use case of the present invention is discussed as follows. The second use case is about a mobility risk intelligence solution. Users analyze driving behavior data to produce a risk score for a driver by inferring various events, such as hard breaking, sharp turn, speeding, steep acceleration, stop violation, etc. Such a risk score will be useful for various solutions, such as usage-based insurance, insurance claim automation, etc. Highly granular data is collected from vehicles and/or driver mobile devices and sent to a cloud server, and the cloud server runs advanced scoring models for computing risk scores. Driving data from millions of drivers is gathered and processed.

For each segment of the road, users analyze highly granular data from a small random subset of drivers and see if there is variation in a number of events (e.g., hard breaking, sharp turn, speeding, steep acceleration, stop violation, etc.) across these drivers. Note that these events are taken as input by the AI solution to compute the overall risk scores. A sampling strategy for each segment is decided based on the variation observed in a previous step.

Next, a third use case is discussed. The third use case is about speech to text conversion/translation. In the current workflow, a speech to text system includes two components, an acoustic model and a linguistic model. The acoustic model converts audio in a file into a sequence of sound samples (each of length ~25 milliseconds) known as acoustic units. The acoustic units are matched to existing "phonemes" which are the sounds used in a language to form meaningful expressions. The linguistic model converts the sequence of acoustic units to words, phrases, and paragraphs. The linguistic model uses long short-term memory networks (LSTMs), transformers, conditional random fields, or hidden Markov models to analyze preceding words and their relationship and to estimate the probability of words that should be used next. Essentially, this achieves consistency in the trained model across multiple subsamples.

In the present invention, in addition to converting audio in a file into a sequence of sound samples (each of length ~25 milliseconds) known as acoustic units, the acoustic model creates multiple data samples of the acoustic units. A data sample may include only every 2nd acoustic unit or every 3rd acoustic unit. For each data sample, the acoustic model independently carries out matching the acoustic units to existing "phonemes". Then, for each data sample, the linguistic model is used to independently carry out processing.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 5, computing environment 500 contains an example of an environment for the execution of at least some of the computer code involved in performing the inventive methods, such as program(s) 526 for accelerated learning from spatio-temporal data. In addition to block 526, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 526, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located off chip. In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 526 in persistent storage 513.

Communication fabric 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 526 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer-implemented method for accelerated learning, the method comprising:

partitioning an independent variable of input data into partitions with respect to a space/time measurement;

creating data samples in each of the partitions, each of the data samples representing the input data and having less granularity;

for each of the partitions, training a machine learning model independently on each of the data samples;

for each of the partitions, comparing results of training on the data samples;

for each of one or more partitions in which results of training on a predetermined number of the data samples are statistically identical at a predetermined confidence level, outputting a result of training on one of the data samples;

for each of one or more rest partitions in which no result of training on the data samples has been outputted, merging each pair of the data samples; and for each of the one or more rest partitions, using merged data samples to train the machine learning model.

2. The computer-implemented method of claim 1, further comprising:

in response to determining that the results of training on the predetermined number of the data samples are statistically identical at the predetermined confidence level for all the partitions, for each of the partitions, outputting a result of training on one of the data samples.

3. The computer-implemented method of claim 1, further comprising:

in response to determining that a partition of the one or more rest partitions has only single merged data sample, outputting a result of training on the single merged data sample for the partition.

4. The computer-implemented method of claim 1, further comprising:

for each of the one or more rest partitions, comparing results of training on the merged data samples; and for each of the one or more rest partitions in which results of training on a predetermined number of the merged data samples are statistically identical at the predetermined confidence level, outputting a result of training on one of the merged data samples.

5. The computer-implemented method of claim 4, further comprising:

for each of the one or more rest partitions in which the results of training on the predetermined number of the merged data samples are not statistically identical at the predetermined confidence level, merging each pair of the merged data samples.

6. The computer-implemented method of claim 1, further comprising:

for each of the one or more rest partitions, comparing results of training on the merged data samples; and in response to determining that results of training on a predetermined number of the merged data samples are statistically identical at the predetermined confidence level for all the one or more rest partitions, for each of the one or more rest partitions, outputting a result of training on one of the merged data samples.

7. A computer program product for accelerated learning, the computer program product comprising a computer readable storage medium having program instructions stored therewith, the program instructions executable by one or more processors, the program instructions executable to:

partition an independent variable of input data into partitions with respect to a space/time measurement;

create data samples in each of the partitions, each of the data samples representing the input data and having less granularity;

for each of the partitions, train a machine learning model independently on each of the data samples;

for each of the partitions, compare results of training on the data samples;

for each of one or more partitions in which results of training on a predetermined number of the data samples are statistically identical at a predetermined confidence level, output a result of training on one of the data samples;

for each of one or more rest partitions in which no result of training on the data samples has been outputted, merge each pair of the data samples; and for each of the one or more rest partitions, use merged data samples to train the machine learning model.

8. The computer program product of claim 7, further comprising the program instructions executable to:

in response to determining that the results of training on the predetermined number of the data samples are statistically identical at the predetermined confidence level for all the partitions, for each of the partitions, output a result of training on one of the data samples.

9. The computer program product of claim 7, further comprising the program instructions executable to:

in response to determining that a partition of the one or more rest partitions has only single merged data sample, output a result of training on the single merged data sample for the partition.

10. The computer program product of claim 7, further comprising the program instructions executable to:

for each of the one or more rest partitions, compare results of training on the merged data samples; and for each of the one or more rest partitions in which results of training on a predetermined number of the merged data samples are statistically identical at the predetermined confidence level, output a result of training on one of the merged data samples.

11. The computer program product of claim 10, further comprising the program instructions executable to:

for each of the one or more rest partitions in which the results of training on the predetermined number of the merged data samples are not statistically identical at the predetermined confidence level, merge each pair of the merged data samples.

12. The computer program product of claim 7, further comprising the program instructions executable to:

for each of the one or more rest partitions, compare results of training on the merged data samples; and in response to determining that results of training on a predetermined number of the merged data samples are statistically identical at the predetermined confidence level for all the one or more rest partitions, for each of the one or more rest partitions, output a result of training on one of the merged data samples.

13. A computer system for accelerated learning, the computer system comprising one or more processors, one or more computer readable tangible storage devices, and program instructions stored on at least one of the one or more computer readable tangible storage devices for execution by at least one of the one or more processors, the program instructions executable to:

partition an independent variable of input data into partitions with respect to a space/time measurement;

create data samples in each of the partitions, each of the data samples representing the input data and having less granularity;

for each of the partitions, train a machine learning model independently on each of the data samples;

for each of the partitions, compare results of training on the data samples;

for each of one or more partitions in which results of training on a predetermined number of the data samples are statistically identical at a predetermined confidence level, output a result of training on one of the data samples;

for each of one or more rest partitions in which no result of training on the data samples has been outputted, merge each pair of the data samples; and for each of the one or more rest partitions, use merged data samples to train the machine learning model.

14. The computer system of claim 13, further comprising the program instruction executable to:

in response to determining that the results of training on the predetermined number of the data samples are statistically identical at the predetermined confidence level for all the partitions, for each of the partitions, output a result of training on one of the data samples.

15. The computer system of claim 13, further comprising the program instructions executable to:

in response to determining that a partition of the one or more rest partitions has only single merged data sample, output a result of training on the single merged data sample for the partition.

16. The computer system of claim 13, further comprising the program instructions executable to:

for each of the one or more rest partitions, compare results of training on the merged data samples; and for each of the one or more rest partitions in which results of training on a predetermined number of the merged data samples are statistically identical at the predetermined confidence level, output a result of training on one of the merged data samples.

17. The computer system of claim 16, further comprising the program instructions executable to:

for each of the one or more rest partitions in which the results of training on the predetermined number of the merged data samples are not statistically identical at the predetermined confidence level, merge each pair of the merged data samples.

18. The computer system of claim 13, further comprising program instructions executable to:

for each of the one or more rest partitions, compare results of training on the merged data samples; and in response to determining that results of training on a predetermined number of the merged data samples are statistically identical at the predetermined confidence level for all the one or more rest partitions, for each of the one or more rest partitions, output a result of training on one of the merged data samples.

* * * * *